(12) United States Patent
Lipcsei et al.

(10) Patent No.: US 8,587,276 B2
(45) Date of Patent: Nov. 19, 2013

(54) CONTROLLERS FOR CONTROLLING OUTPUT SIGNALS OF POWER CONVERTERS

(75) Inventors: Laszlo Lipcsei, Campbell, CA (US); Serban Mihai Popescu, San Carlos, CA (US); Vlad Mihail Dan Popescu-Stanesti, San Jose, CA (US)

(73) Assignee: O2Micro, Inc., Santa Clara, CA (US)

( * ) Notice: Subject to any disclaimer, the term of this patent is extended or adjusted under 35 U.S.C. 154(b) by 195 days.

(21) Appl. No.: 13/099,189

(22) Filed: May 2, 2011

(65) Prior Publication Data

US 2012/0025792 A1 Feb. 2, 2012

Related U.S. Application Data

(60) Provisional application No. 61/370,065, filed on Aug. 2, 2010.

(51) Int. Cl.
*G05F 1/00* (2006.01)
(52) U.S. Cl.
USPC .......................................... 323/282; 323/271
(58) Field of Classification Search
USPC .................................................. 323/271, 282
See application file for complete search history.

(56) References Cited

U.S. PATENT DOCUMENTS

| | | | |
|---|---|---|---|
| 6,188,212 B1* | 2/2001 | Larson et al. | 323/281 |
| 6,437,638 B1* | 8/2002 | Coles et al. | 327/540 |
| 7,852,649 B2* | 12/2010 | Hsiao | 363/97 |
| 2002/0024826 A1 | 2/2002 | Katayama | |
| 2010/0019697 A1* | 1/2010 | Korsunsky et al. | 315/307 |
| 2010/0033146 A1* | 2/2010 | Irissou et al. | 323/282 |

FOREIGN PATENT DOCUMENTS

JP H08331849 A 12/1996

* cited by examiner

*Primary Examiner* — Adolf Berhane
*Assistant Examiner* — Emily P Pham (57) ABSTRACT

A controller for a power converter includes a first amplification stage and a second amplification stage coupled to the first amplification stage. The first amplification stage generates a first amplified signal at a first terminal of an energy storage element according to an output signal the power converter. The second amplification stage generates a second amplified signal at a second terminal of the energy storage element and varies the second amplified signal in response to a change in the output signal. The second amplification stage further decreases the variation of the second amplified signal based on the first amplified signal.

20 Claims, 8 Drawing Sheets

CONTROLLERS FOR CONTROLLING OUTPUT SIGNALS OF POWER CONVERTERS

RELATED APPLICATION

This application claims priority to U.S. Provisional Application No. 61/370,065, filed on Aug. 2, 2010, which is hereby incorporated by reference in its entirety.

BACKGROUND

Figure 1:
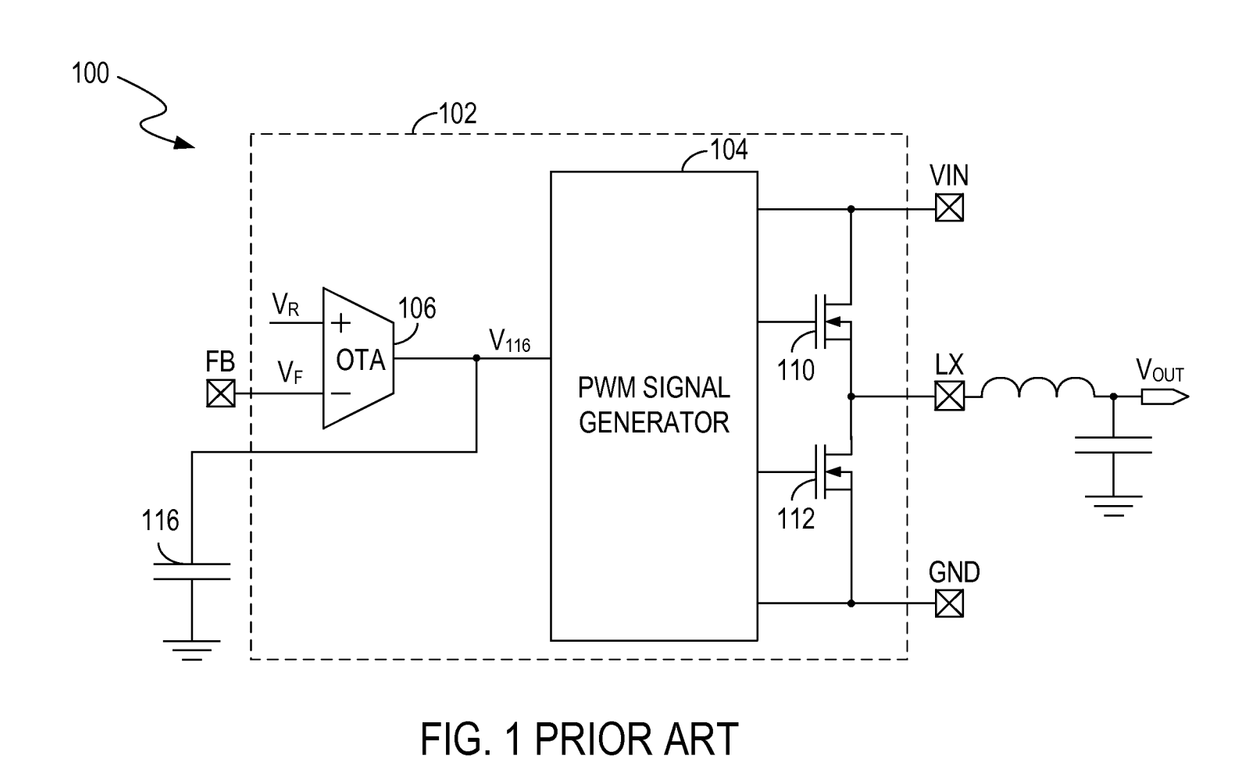
FIG. 1 illustrates a circuit diagram of a conventional DC to DC converter.

Switching controllers can be used in direct-current to direct-current (DC to DC) converters to control output of the DC to DC converters. A circuit diagram of a conventional switching controller 102 for a DC to DC converter 100 is illustrated in FIG. 1. As shown in FIG. 1, the controller 102 includes a pulse-width modulation (PWM) signal generator 104 and an operational transconductance amplifier (OTA) 106.

The PWM signal generator 104 generates a PWM signal to turn on or off switches 110 and 112, so as to adjust the output voltage $V_{OUT}$ of the DC to DC converter 100. The output voltage $V_{OUT}$ can be determined by the duty cycle of the PWM signal. In addition, the PWM signal generator 104 receives a voltage $V_{116}$ on a capacitor 116 to control the duty cycle of the PWM signal. The OTA 106 compares a reference voltage $V_R$ with a feedback voltage $V_F$ that is proportional to the output voltage $V_{OUT}$ to control charging and discharging of the capacitor 116, and therefore to control the voltage $V_{116}$. If the feedback voltage $V_F$ is less than the reference voltage $V_R$, the OTA 106 controls the voltage $V_{116}$ such that the output voltage $V_{OUT}$ increases. If the feedback voltage $V_F$ is greater than the reference voltage $V_R$, the OTA 106 controls the voltage $V_{116}$ such that output voltage $V_{OUT}$ decreases. As a result, the output voltage $V_{OUT}$ can be adjusted to a preset level that is determined by the reference voltage $V_R$.

However, the bandwidth of the amplification circuit that includes the OTA 106 and the capacitor 116 may not be wide enough, such that the speed for the voltage $V_{116}$ to respond to the output voltage $V_{OUT}$ can be relatively slow. In other words, the controller 102 may take a relatively long time to vary the duty cycle of the PWM signal in response to a change in the output voltage $V_{OUT}$.

A conventional method to increase the response speed of the amplification circuit includes widening the bandwidth of the amplification circuit. However, when the bandwidth of the amplification circuit is widened, more noises may be transferred into the controller 102. The controller may be sensitive to undesired noises in the output voltage $V_{OUT}$, and therefore the output voltage $V_{OUT}$ may not be stable. A conventional solution is to reduce the gain of the amplification circuit in exchange for enhancing the stability of the output voltage $V_{OUT}$. However, if the gain of the amplification circuit decreases, the accuracy of the output voltage $V_{OUT}$ is adversely affected.

SUMMARY

A controller for a power converter includes a first amplification stage and a second amplification stage coupled to the first amplification stage. The first amplification stage generates a first amplified signal at a first terminal of an energy storage element according to an output signal the of the power converter. The second amplification stage generates a second amplified signal at a second terminal of the energy storage element and varies the second amplified signal in response to a change in the output signal. The second amplification stage further decreases the variation of the second amplified signal based on the first amplified signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide controllers for power converters such as DC to DC converters. The controller includes amplification circuitry to generate an amplified signal to control an output signal of the DC to DC converter. The amplified signal is generated according to a feedback of the output signal of the DC to DC converter. Advantageously, the amplified signal responds to the output signal of the DC to DC converter relatively fast. In addition, the amplification circuitry can smoothen variation of the amplified signal, so as to smoothen adjustment of the output signal. Thus, the output signal is more stable. Furthermore, since the variation of the amplified signal is smoothened, the amplified signal is less sensitive to undesired noises that may exist in the output signal. Thus, the amplification circuitry can have a relatively high gain to adjust the output signal more accurately.

Furthermore, in one embodiment, the gain of the amplification circuitry can be determined by a feedback circuit. Thus, the frequency behavior, e.g., the bandwidth and the response speed, of the DC to DC converter can also be determined by the feedback circuit. By controlling a parameter in the feedback circuit, the frequency behavior of the DC to DC converter and the gain of the amplification circuitry can be adjusted.

Figure 2:
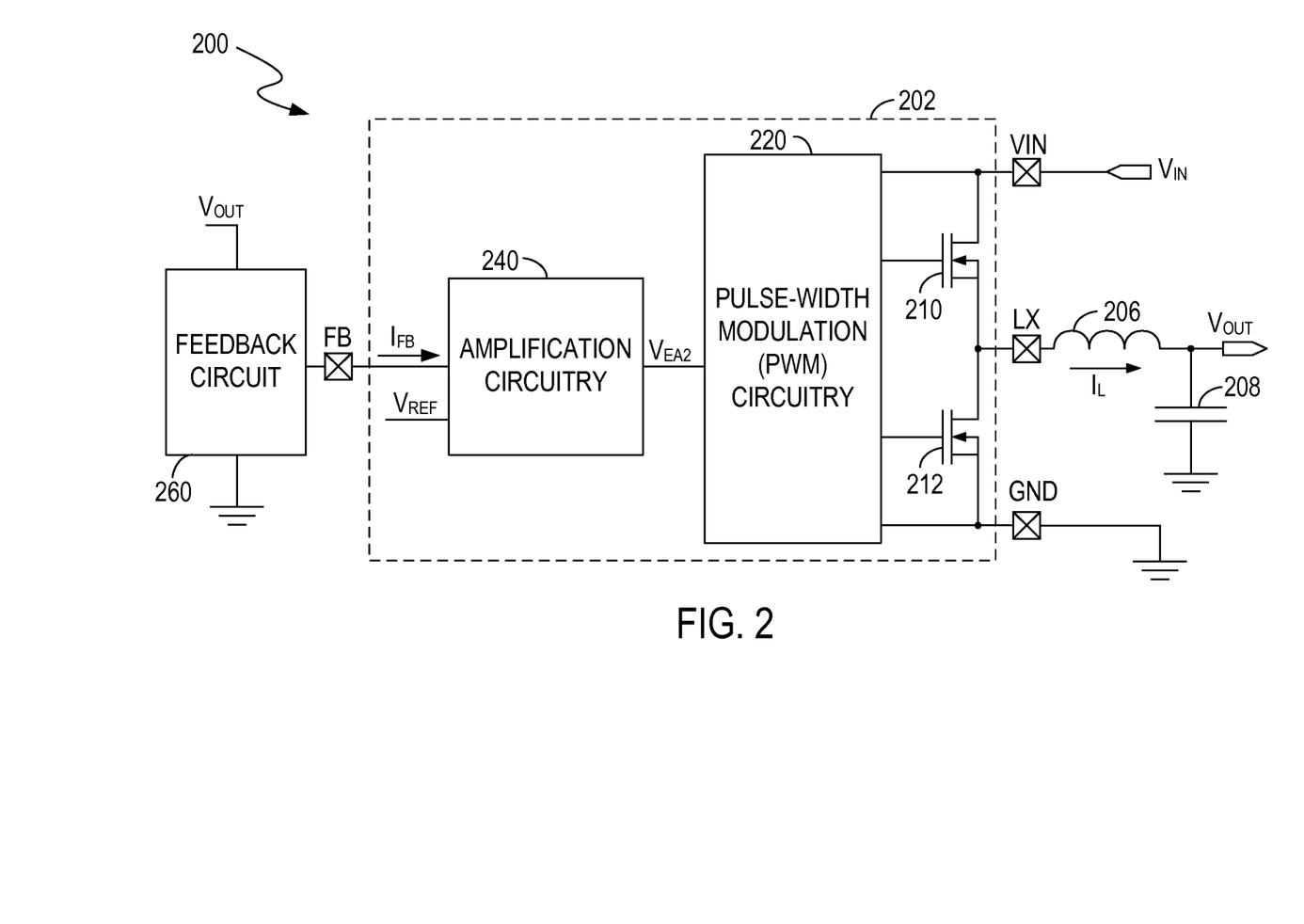
FIG. 2 illustrates a block diagram of an example of a DC to DC converter, in accordance with one embodiment of the present invention.

FIG. 2 illustrates a block diagram of an example of a DC to DC converter 200 that converts an input voltage $V_{IN}$ to an output voltage $V_{OUT}$, in accordance with one embodiment of the present invention. The DC to DC converter 200 includes a controller 202, a feedback circuit 260, an energy storage component, e.g., an inductor 206, and a filter component, e.g. a capacitor 208.

The feedback circuit 260 receives the output voltage $V_{OUT}$ of the DC to DC converter 200 and generates a feedback current $I_{FB}$ indicative of the output voltage $V_{OUT}$ to the controller 202. The controller 202 controls the output voltage $V_{OUT}$ and an inductor current $I_L$ through the inductor 206 according to the feedback current $I_{FB}$. In one embodiment, the inductor current $I_L$ through the inductor 206 is a ripple current. The capacitor 208 can filter the inductor current $I_L$, so as to provide a DC output, e.g., a DC current or a DC voltage $V_{OUT}$, at the output terminal of the DC to DC converter 200.

The controller 202 includes an input terminal $V_{IN}$ to receive the input voltage $V_{IN}$, a control terminal LX to control the output voltage $V_{OUT}$, and a feedback terminal FB to receive a feedback current $I_{FB}$ provided by the feedback circuit 260. In one embodiment, the control circuit 202 includes a high-side switch 210 coupled between the input terminal $V_{IN}$ and the control terminal LX, and a low-side switch 212 coupled between the control terminal LX and ground. In an alternative embodiment, the low-side switch 212 can be replaced by a diode that includes a cathode coupled to the control terminal LX and an anode coupled to ground. The controller 202 also includes control circuitry, e.g., pulse-width modulation (PWM) circuitry 220, coupled to the switches 210 and 212, and includes amplification circuitry 240 coupled between the feedback terminal FB and the PWM circuitry 220.

In one embodiment, the amplification circuitry 240 receives the feedback current $I_{FB}$ to generate an amplified signal $V_{EA2}$. The PWM circuitry 220 receives the amplified signal $V_{EA2}$ and controls the switches 210 and 212 to control an output signal, e.g., an output voltage or current, of the DC to DC converter 200 according to the amplified signal $V_{EA2}$. By way of example, the PWM circuitry 220 generates a control signal such as a PWM signal to turn on or off the switches 210 and 212. The output signal of the DC to DC converter 200 can be determined by the duty cycle of the PWM signal. The PWM circuitry 220 also controls the duty cycle of the PWM signal according to the amplified signal $V_{EA2}$.

More specifically, in one embodiment, when the PWM signal is logic high, the high-side switch 210 is on and the low-side switch 212 is off. The control terminal LX is coupled to the input terminal $V_{IN}$, and therefore the inductor current $I_L$ increases. When PWM signal is logic low, the high-side switch 210 is off and the low-side switch 212 is on. The control terminal LX is coupled to ground, and therefore the inductor current $I_L$ decreases. As such, the output current of the DC to DC converter 200, e.g., the average current of the inductor current $I_L$, can increase by increasing the duty cycle of the PWM signal, and decrease by reducing the duty cycle of the PWM signal. The output voltage $V_{OUT}$ of the DC to DC converter 200 can also increase by increasing the duty cycle of the PWM signal, and decrease by reducing the duty cycle of the PWM signal. Since the amplified signal $V_{EA2}$ controls the duty cycle of the PWM signal, the output voltage or current of the DC to DC converter 200 can be adjusted to a target level by controlling the amplified signal $V_{EA2}$.

Advantageously, the amplified signal $V_{EA2}$ can respond to the output signal of the DC to DC converter relatively fast. For example, if a change occurs in the output voltage $V_{OUT}$, the amplification circuitry 240 can vary the amplified signal $V_{EA2}$ accordingly relatively fast. Moreover, the amplification circuitry 240 can decrease the variation of the amplified signal $V_{EA2}$ to smoothen the adjustment of the output signal of the DC to DC converter. Thus, the amplified signal $V_{EA2}$ as well as the adjustment of the output signal is more stable.

Figure 3:
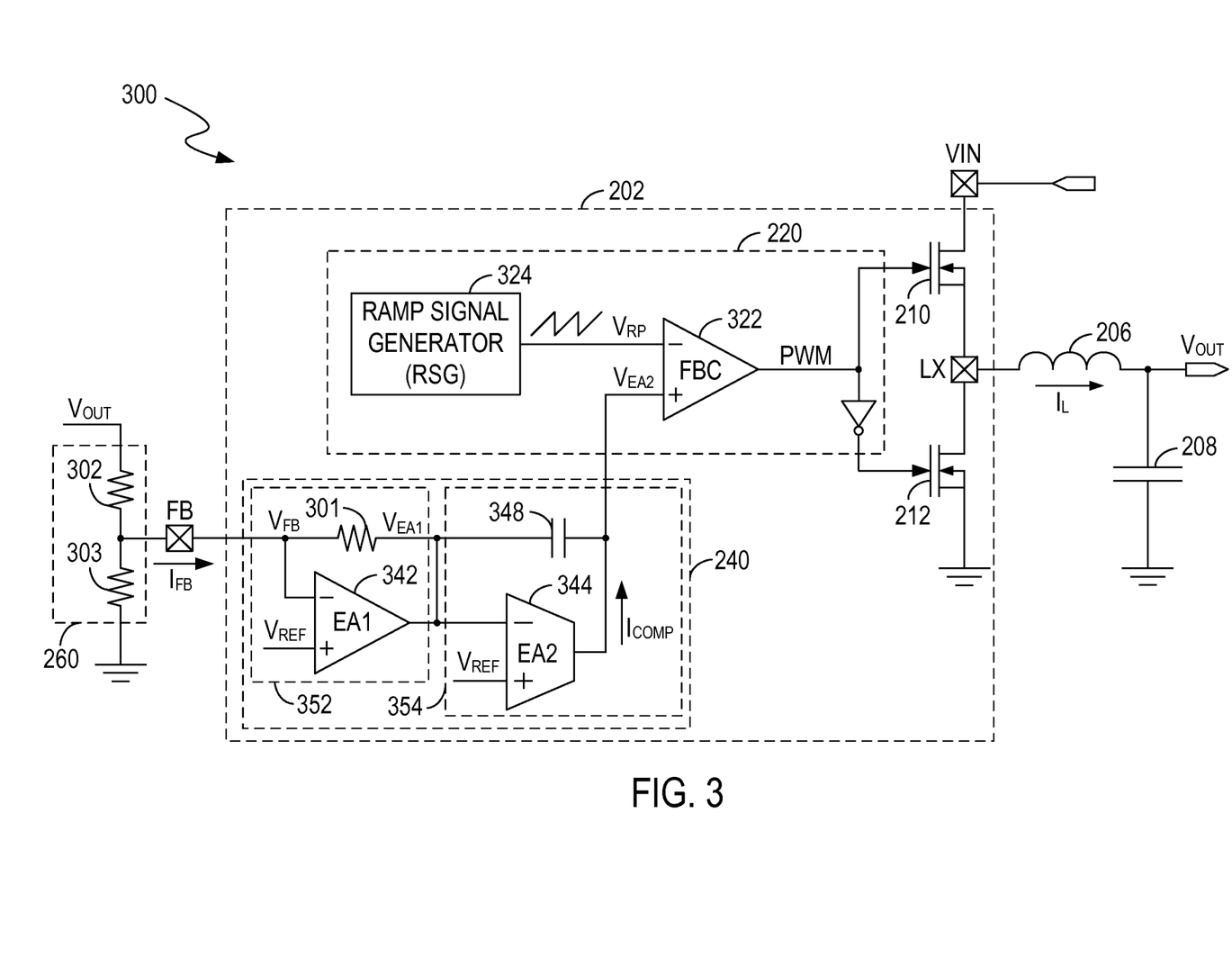
FIG. 3 illustrates a circuit diagram of an example of a DC to DC converter, in accordance with one embodiment of the present invention.

FIG. 3 illustrates a circuit diagram of an example of a DC to DC converter 300, in accordance with one embodiment of the present invention. Elements that are labeled the same as in FIG. 2 have similar functions.

As shown in FIG. 3, the PWM circuitry 220 includes a ramp signal generator 324 (hereinafter, RSG 324) and a feedback comparator 322 (hereinafter, FBC comparator 322). The RSG 324 generates a ramp signal $V_{RP}$, e.g., a ripple voltage that has a substantially constant ripple magnitude. The FBC comparator 322 receives the ramp signal $V_{RP}$ from the RSG 324 and the amplified signal $V_{EA2}$ from the amplification circuitry 240, and generates a PWM signal by comparing the ramp signal $V_{RP}$ with the amplified signal $V_{EA2}$. In the example of FIG. 3, the PWM signal is logic high if the amplified signal $V_{EA2}$ is greater than the ramp signal $V_{RP}$, and is logic low if the amplified signal $V_{EA2}$ is less than the ramp signal $V_{RP}$. As such, the amplified signal $V_{EA2}$ controls the duty cycle of the PWM signal. For example, the duty cycle of the PWM signal increases as the amplified signal $V_{EA2}$ increases, and decreases as the amplified signal $V_{EA2}$ decreases.

The amplification circuitry 240 includes a first amplification stage 352 and a second amplification stage 354. The first amplification stage 352 includes an error amplifier 342 (hereinafter, EA1 342) and a resistive element, e.g., a resistor 301. The second amplification stage 354 includes an error amplifier 344 (hereinafter, EA2 344) and an energy storage element, e.g., a capacitor 348. In one embodiment, the first amplification stage 352 generates a first amplified signal $V_{EA1}$ at a first terminal of the capacitor 348 according to the output signal of the DC to DC converter 300. The second amplification stage 354 generates a second amplified signal $V_{EA2}$ at a second terminal of the capacitor 348 according to the first amplified signal $V_{EA1}$. In addition, the amplification circuitry 240 varies the second amplified signal $V_{EA2}$ in response to a change in the output signal of the DC to DC converter 300.

More specifically, as shown in FIG. 3, the feedback circuit 260 includes a resistor divider, e.g., series-coupled resistors 302 and 303. The resistor 301 in the first amplification stage 352 has a first end coupled to the node between the resistors 302 and 303 and has a second end coupled to the capacitor 348. In one embodiment, the EA1 342 is an operational amplifier that maintains the first end of the resistor 301 at a reference level of a reference signal $V_{REF}$. By way of example, the EA1 342 receives a voltage $V_{FB}$ at the first end of the resistor 301 via its inverting input terminal, and receives a reference voltage $V_{REF}$ via its non-inverting input terminal. Therefore, the following equation is obtained:

$$V_{FB} = V_{REF}. \qquad (1)$$

Additionally, the feedback current $I_{FB}$ can be given by:

$$I_{FB}=(V_{OUT}-V_{REF})/R_{302}-V_{REF}/R_{303}, \quad (2)$$

where $R_{302}$ and $R_{303}$ represent resistance of the resistors 302 and 303, respectively. As such, the feedback current $I_{FB}$ is proportional to the output voltage $V_{OUT}$. The feedback current $I_{FB}$ flows through the resistor 301 to generate the amplified signal $V_{EA1}$. That is, the resistor 301 provides the amplified signal $V_{EA1}$ at its second end. The amplified signal $V_{EA1}$ can be given by:

$$V_{EA1}=V_{REF}-I_{FB} \times R_{301}, \quad (3)$$

where $R_{301}$ represents resistance of the resistor 301. According to equations (2) and (3), the amplified signal $V_{EA1}$ can be given by:

$$V_{EA1}=(1+R_{301}/R_{302}+R_{301}/R_{303}) \times V_{REF}-(R_{301}/R_{302}) \times V_{OUT}. \quad (4)$$

As such, the following equation is obtained:

$$\Delta V_{EA1}=-(R_{301}/R_{302}) \times \Delta V_{OUT}, \quad (5)$$

where $\Delta V_{OUT}$ represents a change in the output voltage $V_{OUT}$, and $\Delta V_{EA1}$ represents a change in the amplified signal $V_{EA1}$ in response to the change $\Delta V_{OUT}$ in the output voltage $V_{OUT}$. Thus, a gain $g_1$ of the combined circuit that includes the first amplification stage 352 and the feedback circuit 260 is equal to $-(R_{301}/R_{303})$. The amplified signal $V_{EA1}$ can increase as the output voltage $V_{OUT}$ decreases, and decrease as the output voltage $V_{OUT}$ increases.

In addition, in one embodiment, the EA2 344 is an operational transconductance amplifier that compares the amplified signal $V_{EA1}$ with a reference signal $V_{REF}$ to control charging and discharging of the capacitor 348. Specifically, the EA2 344 generates a control current $I_{COMP}$ proportional to the difference between the reference signal $V_{REF}$ and the amplified signal $V_{EA1}$, e.g., $I_{COMP} \propto V_{REF}-V_{EA1}$. In one embodiment, if the amplified signal $V_{EA1}$ is less than the reference signal $V_{REF}$, the EA2 344 generates a control current $I_{COMP}$ flowing from the output terminal of the EA2 344 to the capacitor 348 to increase the amplified signal $V_{EA2}$. If the amplified signal $V_{EA1}$ is greater than the reference signal $V_{REF}$, the EA2 344 generates a control current $I_{COMP}$ flowing from the capacitor 348 to the output terminal of the EA2 344 to decrease the amplified signal $V_{EA2}$. If the amplified signal $V_{EA1}$ is equal to the reference signal $V_{REF}$, the control current $I_{COMP}$ can be equal to zero to maintain the amplified signal $V_{EA2}$.

In one embodiment, the amplification circuitry 240 operates in a steady state. In the steady state, input voltages of the EA2 344 are equal to each other, e.g., $V_{EA1}=V_{REF}$. According to equation (3), the feedback current $I_{FB}$ is equal to zero in the steady state. In addition, the amplified signal $V_{EA2}$ is maintained at a level $V_{SP}$ and the output voltage $V_{OUT}$ is at a target level $V_{TARGET}$. According to equation (4), the target level $V_{TARGET}$ of the output voltage $V_{OUT}$ can be given by:

$$V_{TARGET}=(1+R_{302}/R_{303})*V_{REF}. \quad (6)$$

Accordingly, the controller 202 can adjust the output voltage $V_{OUT}$ toward a preset level $V_{TARGET}$ that is determined by the reference signal $V_{REF}$ and the ratio of the resistance $R_{302}$ to the resistance $R_{303}$.

In the example of FIG. 3, the EA1 342 and the EA2 344 receive the same reference signal $V_{REF}$. However, the invention is not so limited. In another embodiment, the EA1 342 and the EA2 344 can receive different reference signals.

In one embodiment, the resistors 302 and 301 have the same resistance R, e.g., $R_{302}=R_{301}=R$. Thus, equation (5) is rewritten as:

$$\Delta V_{EA1}=-\Delta V_{OUT}. \quad (7)$$

In one such embodiment, if the output voltage $V_{OUT}$ increases from the target level $V_{TARGET}$ by an increment $\Delta V_{OUT}$, the amplified signal $V_{EA1}$ decreases from the reference signal $V_{REF}$ by a decrement $\Delta V_{OUT}$. The amplified signal $V_{EA2}$ also decreases from the level $V_{SP}$ by a decrement $\Delta V_{OUT}$. Thus, the duty cycle of the PWM signal decreases to decrease the output voltage $V_{OUT}$. Similarly, if the output voltage $V_{OUT}$ decreases from the target level $V_{TARGET}$ by a decrement $\Delta V_{OUT}$, the amplified signal $V_{EA1}$ increases from the reference signal $V_{REF}$ by an increment $\Delta V_{OUT}$, and the amplified signal $V_{EA2}$ increases from the level $V_{SP}$ by an increment $\Delta V_{OUT}$. Thus, the duty cycle of the PWM signal increases to increase the output voltage $V_{OUT}$. Accordingly, based on the second amplified signal $V_{EA2}$, the EA2 344 adjusts the first amplified signal $V_{EA1}$ toward the reference signal $V_{REF}$ and adjusts the output voltage $V_{OUT}$ toward the target level $V_{TARGET}$.

Advantageously, since a bandwidth of the combined circuit of the EA1 342 and the resistors 302, 303 and 301 is relatively large, the amplified signal $V_{EA1}$ responds to the output voltage $V_{OUT}$ relatively fast. The amplified signal $V_{EA2}$ also responds to the output voltage $V_{OUT}$ relatively fast because a voltage across the capacitor 348 does not change abruptly. In other words, the amplification circuitry 240 has a relatively fast response speed. Thus, compared with the conventional controller 102 in FIG. 1, the controller 202 in FIG. 2 takes less time to vary the duty cycle of the PWM signal in response to a change in the output voltage $V_{OUT}$.

Furthermore, the EA2 344 decreases the variation of the amplified signal $V_{EA2}$ and the variation of the duty cycle of the PWM signal if the difference between the amplified signal $V_{EA1}$ and the reference signal $V_{REF}$ is greater than a specified level that is, e.g., zero. The specified level is determined by the inherent characteristic of the EA2 344. By way of example, if the amplified signal $V_{EA1}$ decreases from the reference signal $V_{REF}$ by a decrement $\Delta V_{Out}$, the EA2 344 outputs a control current $I_{COMP}$ to the capacitor 348, so as to increase the amplified signal $V_{EA2}$ toward the level $V_{SP}$. Similarly, if the amplified signal $V_{EA1}$ increases from the reference signal $V_{REF}$ by an increment $\Delta V_{OUT}$, the EA2 344 can absorb a control current $I_{COMP}$ from the capacitor 348, so as to decrease the amplified signal $V_{EA2}$ toward the level $V_{SP}$. As such, the EA2 344 decreases the variation of the amplified signal $V_{EA2}$. In other words, the process of adjusting the output voltage $V_{OUT}$ to the target level $V_{TARGET}$ can be smoothened. The process of adjusting the amplified signal $V_{EA1}$ to the reference signal $V_{REF}$ can also be smoothened. Advantageously, the output voltage $V_{OUT}$ is relatively stable even though the amplification circuitry 240 has a relatively fast response speed. Furthermore, the EA2 344 can have a relatively high gain, such that the amplified signal $V_{EA1}$ can be adjusted to the reference signal $V_{REF}$ more accurately. Thus, the output voltage $V_{OUT}$ can also be adjusted to the target level $V_{TARGET}$ more accurately.

In one embodiment, the frequency behavior, e.g., the bandwidth and the response speed, of the DC to DC converter 300 is determined by the feedback circuit 260. More specifically, the combined circuit that includes the feedback circuit 260 and the amplification circuitry 240 has a gain-bandwidth product (GBWP). The GBWP of the combined circuit can be given by:

$$GBWP=G \times BW, \quad (8)$$

where G and BW represent the gain and the bandwidth of the combined circuit respectively. The GBWP of the combined circuit of the feedback circuit 260 and the amplification circuitry 240 has a maximum limit that can be determined by the input voltage $V_{IN}$ and the output voltage $V_{OUT}$. Thus, the bandwidth BW of the combined circuit can increase by reducing the gain G of the combined circuit, and can decrease by increasing the gain G.

According to equation (5), the gain $g_1$ of the combined circuit that includes the first amplification stage 352 and the feedback circuit 260 is equal to $-(R_{301}/R_{302})$. Thus, the gain $g_1$ can be controlled by adjusting the resistance ratio $R_{301}/R_{302}$. The gain G of the combined circuit of the feedback circuit 260 and the amplification circuitry 240 can also be controlled by adjusting the resistance ratio $R_{301}/R_{302}$. As a result, the bandwidth BW of the combined circuit of the feedback circuit 260 and the amplification circuitry 240 can be controlled by adjusting the resistance ratio $R_{301}/R_{302}$. In one embodiment, the feedback circuit 260 can be implemented outside the controller 202, such that the gain G and the bandwidth BW are externally-controllable.

Figure 4:
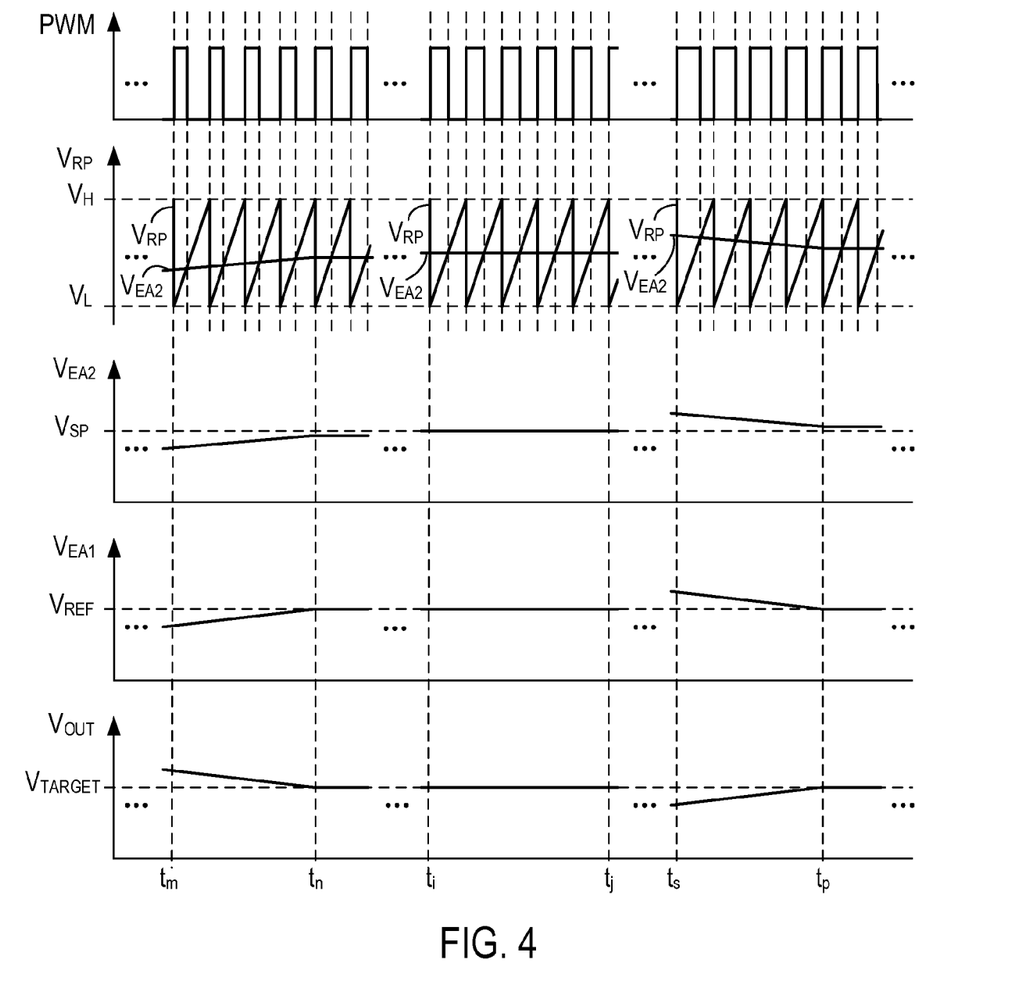
FIG. 4 illustrates examples of plots for waveforms of signals associated with a DC to DC converter, in accordance with one embodiment of the present invention.

FIG. 4 illustrates examples of plots for waveforms of the PWM signal, the ramp signal $V_{RP}$, the amplified signal $V_{EA2}$, the amplified signal $V_{EA1}$, and the output voltage $V_{OUT}$, in accordance with one embodiment of the present invention. FIG. 4 is described in combination with FIG. 2 and FIG. 3.

As shown in FIG. 4, during a steady state, e.g., from time $t_i$ to time $t_j$, the output voltage $V_{OUT}$ is at the target level $V_{TARGET}$, and the amplified signal $V_{EA1}$ is equal to the reference signal $V_{REF}$. The amplified signal $V_{EA2}$ is at the level $V_{SP}$ that is relatively stable, and therefore the PWM signal has a relatively stable duty cycle.

In one embodiment, the level $V_{SP}$ is determined by power provided to a load circuit that is coupled to the output terminal of the DC to DC converter 300. By way of example, if the load circuit absorbs more power from the DC to DC converter 300, the level $V_{SP}$ may increase to increase the duty cycle of the PWM signal in order to maintain the output voltage $V_{OUT}$. If the load circuit absorbs less power, the level $V_{SP}$ may decrease to reduce the duty cycle of the PWM signal in order to maintain the output voltage $V_{OUT}$.

As shown in FIG. 4, the ramp signal $V_{RP}$ has a maximum level $V_H$ and a minimum level $V_L$. The ramp signal $V_{RP}$ ramps up and down between the maximum level $V_H$ and the minimum level $V_L$. Thus, the ramp signal $V_{RP}$ has an average level $V_{RP\_AVE}$ given by: $V_{RP\_AVE}=(V_H+V_L)/2$. In one embodiment, the average level $V_{RP\_AVE}$ of the ramp signal $V_{RP}$ can be determined by, e.g., proportional to, the input voltage $V_{IN}$ of the DC to DC converter 300. For example, if the input voltage $V_{IN}$ increases, the average level $V_{RP\_AVE}$ of the ramp signal $V_{RP}$ can increase to reduce the duty cycle of the PWM signal. If the input voltage $V_{IN}$ decreases, the average level $V_{RP\_AVE}$ of the ramp signal $V_{RP}$ can decrease to increase the duty cycle of the PWM signal. Thus, a change in the input voltage $V_{IN}$ causes less influence on the output voltage $V_{OUT}$. In other words, the output voltage $V_{OUT}$ remains stable even if the input voltage $V_{IN}$ varies.

In one embodiment, when the output voltage $V_{OUT}$ is greater than the target level $V_{TARGET}$, e.g., at time $t_m$, the amplified signal $V_{EA1}$ is less than the reference signal $V_{REF}$, and the amplified signal $V_{EA2}$ is less than the level $V_{SP}$. As such, the duty cycle of the PWM signal decreases to decrease the output voltage $V_{OUT}$. During time $t_m$ to time $t_n$, the output voltage $V_{OUT}$ can decrease to the target level $V_{TARGET}$ smoothly, and the amplified signal $V_{EA1}$ can increase to the reference signal $V_{REF}$ smoothly. In one embodiment, the increment of the output voltage $V_{OUT}$ may be caused by a decrement of power absorbed by the load circuit. In one such embodiment, the amplified signal $V_{EA2}$ may increase to a level that is less than the level $V_{SP}$, and enter a steady state.

Similarly, when the output voltage $V_{OUT}$ is less than the target level $V_{TARGET}$, e.g., at time $t_s$, the amplified signal $V_{EA1}$ is greater than the reference signal $V_{REF}$, and the amplified signal $V_{EA2}$ is greater than the level $V_{SP}$. As such, the duty cycle of the PWM signal increases to increase the output voltage $V_{OUT}$. During time $t_s$ to time $t_p$, the output voltage $V_{OUT}$ can increase to the target level $V_{TARGET}$ smoothly, and the amplified signal $V_{EA1}$ can decrease to the reference signal $V_{REF}$ smoothly. In one embodiment, the decrement of the output voltage $V_{OUT}$ may be caused by an increment of power absorbed by the load circuit. In one such embodiment, the amplified signal $V_{EA2}$ may decrease to a level that is greater than the level $V_{SP}$, and enter a steady state.

Figure 5:
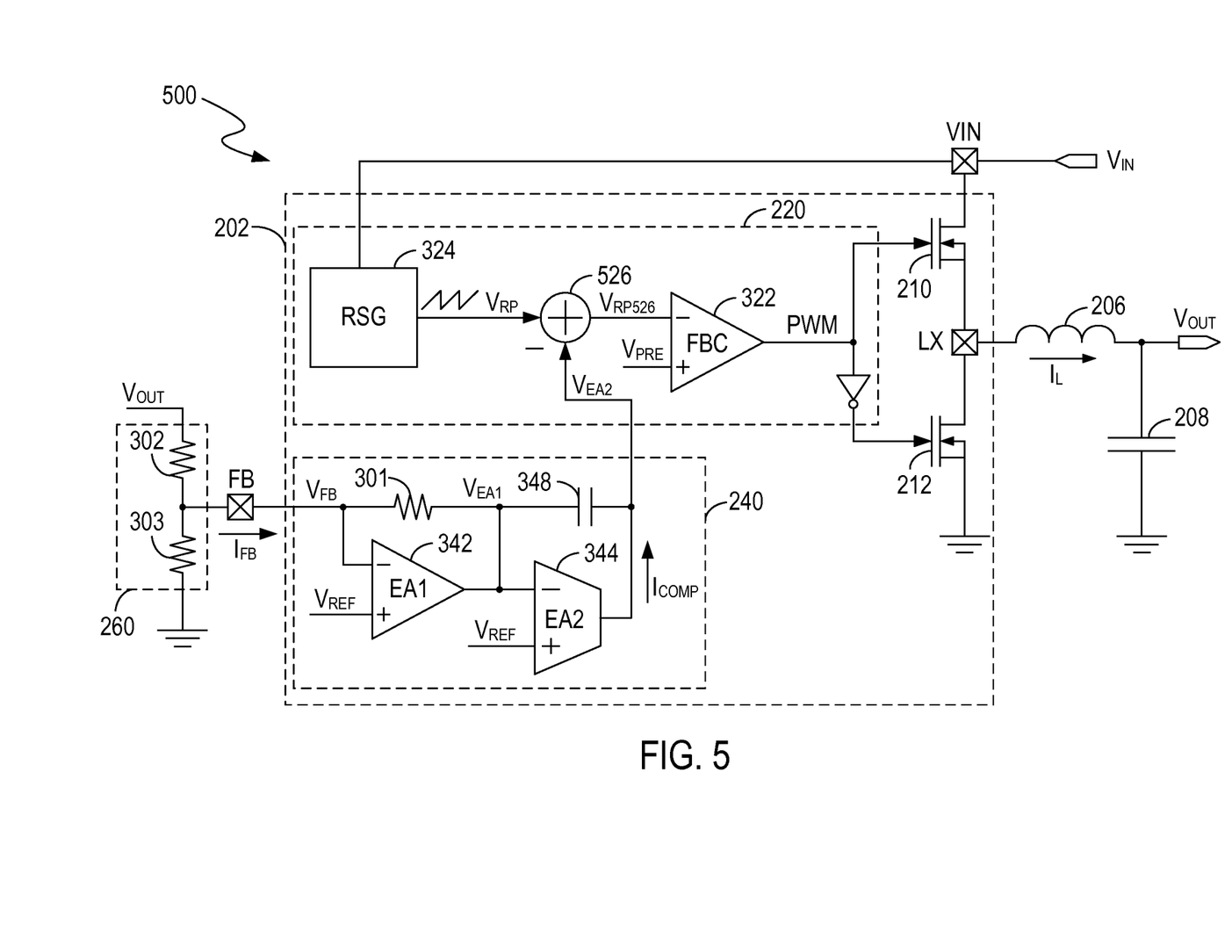
FIG. 5 illustrates a circuit diagram of an example of a DC to DC converter, in accordance with one embodiment of the present invention.

FIG. 5 illustrates a circuit diagram of an example of a DC to DC converter 500, in accordance with one embodiment of the present invention. Elements that are labeled the same as in FIG. 2 and FIG. 3 have similar functions.

In the example of FIG. 5, the PWM circuitry 220 further includes a subtracter 526 that is coupled to the RSG 324, the amplification circuitry 240, and the FBC comparator 322. The subtracter 526 receives the ramp signal $V_{RP}$ from the RSG 324 and the amplified signal $V_{EA2}$ from the EA2 344, and generates a ramp signal $V_{RP526}$ that is equal to the ramp signal $V_{RP}$ minus the amplified signal $V_{EA2}$ to the FBC comparator 322. The FBC comparator 322 compares the ramp signal $V_{RP526}$ with a predetermined level $V_{PRE}$, and adjusts the duty cycle of the PWM signal according to the comparison.

In one embodiment, if the output voltage $V_{OUT}$ is greater than a target level $V_{TARGET}$, the amplified signal $V_{EA2}$ can decrease to increase the average level of the ramp signal $V_{RP526}$. Thus, the output voltage $V_{OUT}$ decreases. If the output voltage $V_{OUT}$ is less than the target level $V_{TARGET}$, the amplified signal $V_{EA2}$ can increase to decrease the average level of the ramp signal $V_{RP526}$. Thus, the output voltage $V_{OUT}$ increases. As a result, the output voltage $V_{OUT}$ can be adjusted to the target level $V_{TARGET}$.

Figure 6:
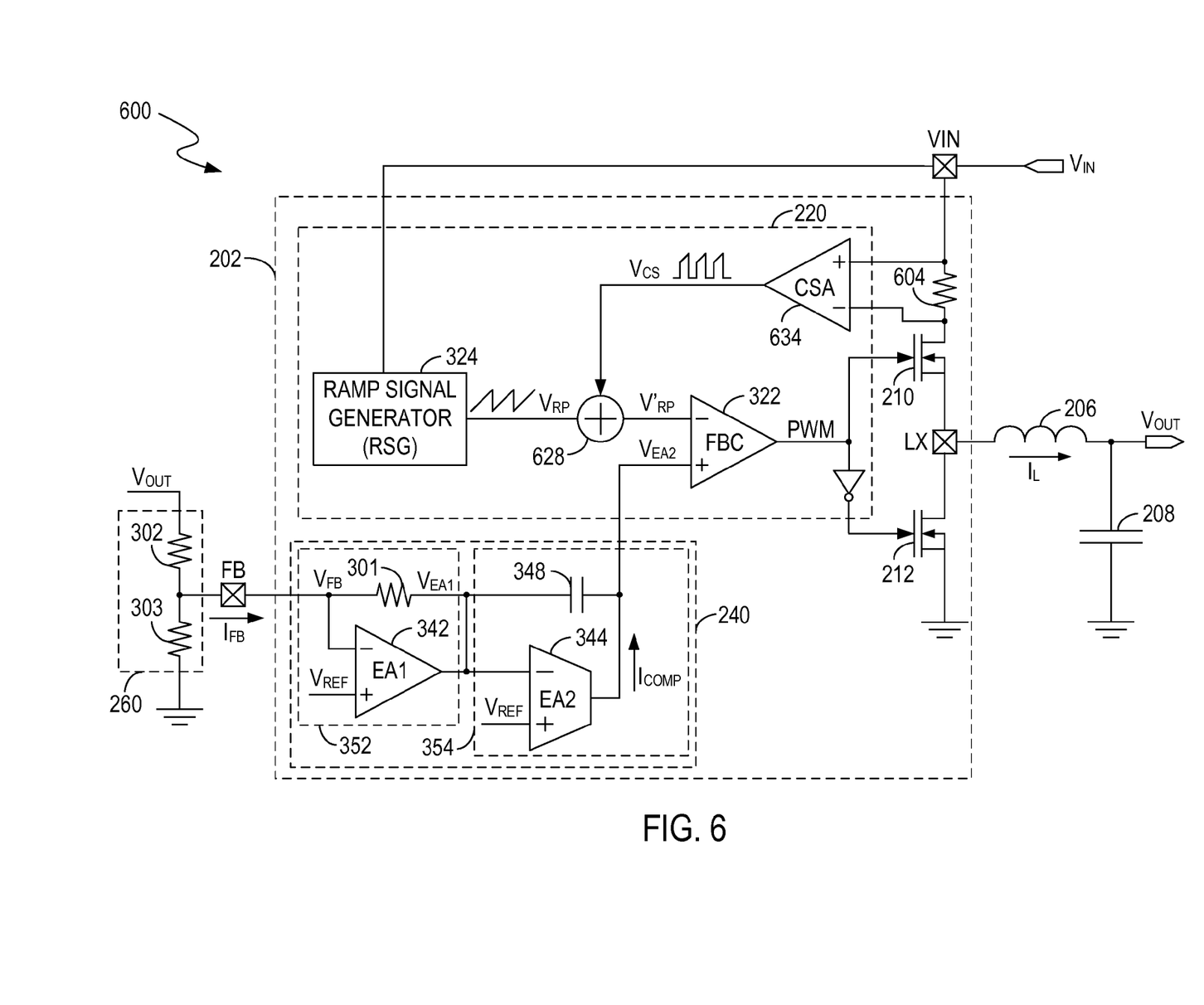
FIG. 6 illustrates a circuit diagram of an example of a DC to DC converter, in accordance with one embodiment of the present invention.

FIG. 6 illustrates a circuit diagram of an example of a DC to DC converter 600, in accordance with one embodiment of the present invention. Elements that are labeled the same as in FIG. 2 and FIG. 3 have similar functions. In the example of FIG. 6, the controller 202 further includes a sense resistor 604. The PWM circuitry 220 further includes a current sense amplifier 634 (hereinafter, CSA amplifier 634) and an adder 628.

In one embodiment, when the high-side switch 210 is on and the low-side switch 212 is off, the inductor current $I_L$ flows through the sense resistor 604 to provide a sense signal, e.g., a voltage across the sense resistor 604, indicative of the inductor current $I_L$ to the CSA amplifier 634. The CSA amplifier 634 generates an amplified signal $V_{CS}$ proportional to the sense signal. The adder 628 can generate a ramp signal $V'_{RP}$ equal to the ramp signal $V_{RP}$ plus the amplified signal $V_{CS}$. Thus, an average level of the ramp signal $V'_{RP}$ can increase as an average level of the inductor current $I_L$ increases, and decrease as the average level of the inductor current $I_L$ decreases.

The FBC comparator 322 controls the PWM signal by comparing the ramp signal $V'_{RP}$ with the amplified signal $V_{EA2}$. As such, if the output current of the DC to DC converter 600 increases, the FBC comparator 322 can decrease an average duty cycle of the PWM signal to decrease the output current. If the output current of the DC to DC converter 600 decreases, the FBC comparator 322 can increase the average duty cycle of the PWM signal to increase the output current. Consequently, the output current and the output voltage of the DC to DC converter 600 can be more stable.

In the example of FIG. 6, the output terminal of the EA2 344 is coupled to the non-inverting input terminal of the FBC comparator 322. However, the invention is not so limited. In another embodiment, similar to the illustration in FIG. 5, the output terminal of the EA2 344 can be coupled to the inverting input terminal of the FBC comparator 322 via the subtracter 526 in FIG. 5. In one such embodiment, the subtracter 526 can be coupled between the adder 628 and the FBC 322, or coupled between the RSG 324 and the adder 628. The non-inverting input terminal of the FBC 322 can receive the predetermined level $V_{PRE}$. The inverting input terminal of the FBC 322 can receive a ramp signal that is equal to the ramp signal $V_{RP}$ plus the amplified signal $V_{CS}$ and minus the amplified signal $V_{EA2}$.

Figure 7:
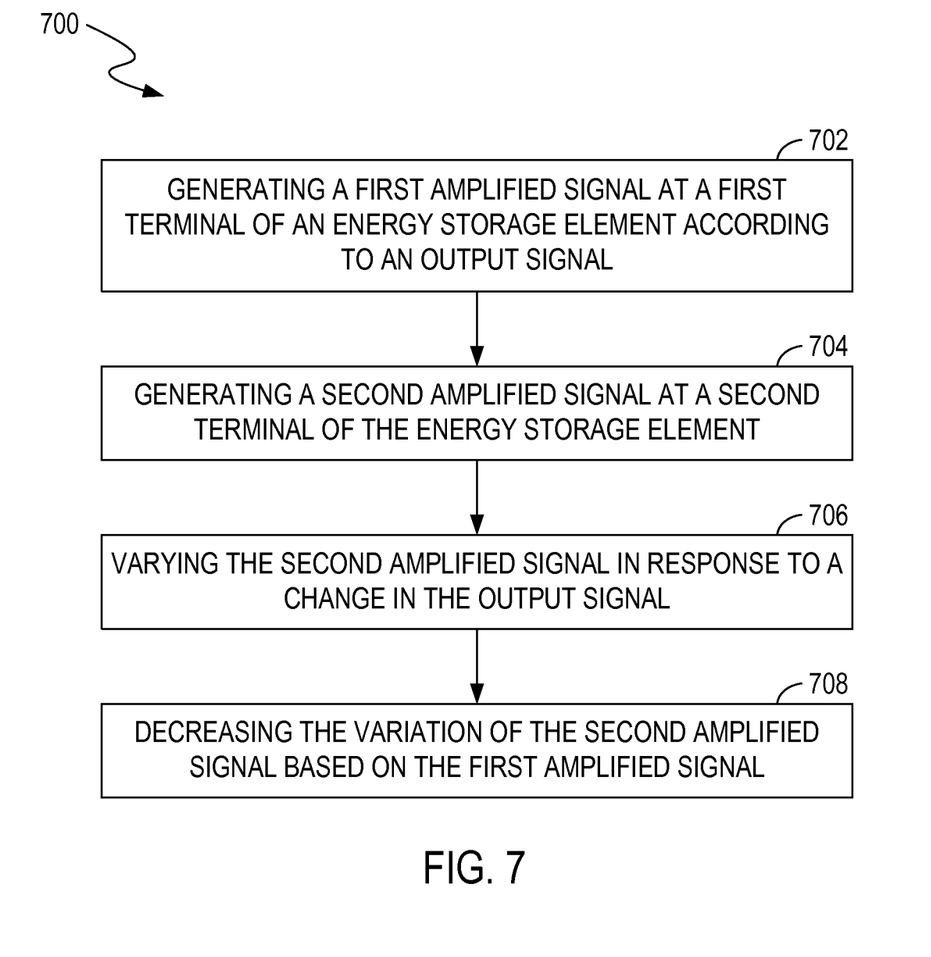
FIG. 7 illustrates a flowchart of examples of operations performed by a controller for a DC to DC converter, in accordance with one embodiment of the present invention.

FIG. 7 illustrates a flowchart 700 of examples of operations performed by the controller for the DC to DC converter 200, 300, 500, or 600, in accordance with one embodiment of the present invention. FIG. 7 is described in combination FIG. 2, FIG. 3, FIG. 5 and FIG. 6.

In block 702, the first amplification stage 352 generates a first amplified signal $V_{EA1}$ at a first terminal of an energy storage element, e.g., the capacitor 348, according an output signal, e.g., the output voltage $V_{OUT}$, of the DC to DC converter.

In block 704, the second amplification stage 354 generates a second amplified signal $V_{EA2}$ at a second terminal of the energy storage element, e.g., the capacitor 348.

In block 706, the second amplification stage 354 varies the second amplified signal $V_{EA2}$ in response a change in the output signal, e.g., the output voltage $V_{OUT}$, of the DC to DC converter. By way of example, according to equation (7), if the output voltage $V_{OUT}$ increases from a target level $V_{TARGET}$ by an increment $\Delta V_{OUT}$, the first amplified signal $V_{EA1}$ as well as the second amplified signal $V_{EA2}$ decreases from the reference signal $V_{REF}$ by a decrement $\Delta V_{OUT}$. If the output voltage $V_{OUT}$ decreases from the target level $V_{TARGET}$ by a decrement $\Delta V_{OUT}$, the first amplified signal $V_{EA1}$ as well as the second amplified signal $V_{EA2}$ increases from the reference signal $V_{REF}$ by an increment $\Delta V_{OUTT}$.

In block 708, the second amplification stage 354 decreases the variation of the second amplified signal $V_{EA2}$ based on the first amplified signal $V_{EA1}$. By way of example, if the first amplified signal $V_{EA1}$ decreases from the reference signal $V_{REF}$ by a decrement $\Delta V_{EA1}$, the second amplified signal $V_{EA2}$ can also decrease by a decrement $\Delta V_{EA1}$. The EA2 344 can output a control current $I_{COMP}$ to the capacitor 348 to increase the second amplified signal $V_{EA2}$. If the first amplified signal $V_{EA1}$ increases from the reference signal $V_{REF}$ by an increment $\Delta V_{EA1}$, the second amplified signal $V_{EA2}$ can also increase by an increment $\Delta V_{EA1}$. The EA2 344 can absorb a control current $I_{COMP}$ from the capacitor 348 to decrease the second amplified signal $V_{EA2}$.

Figure 8:
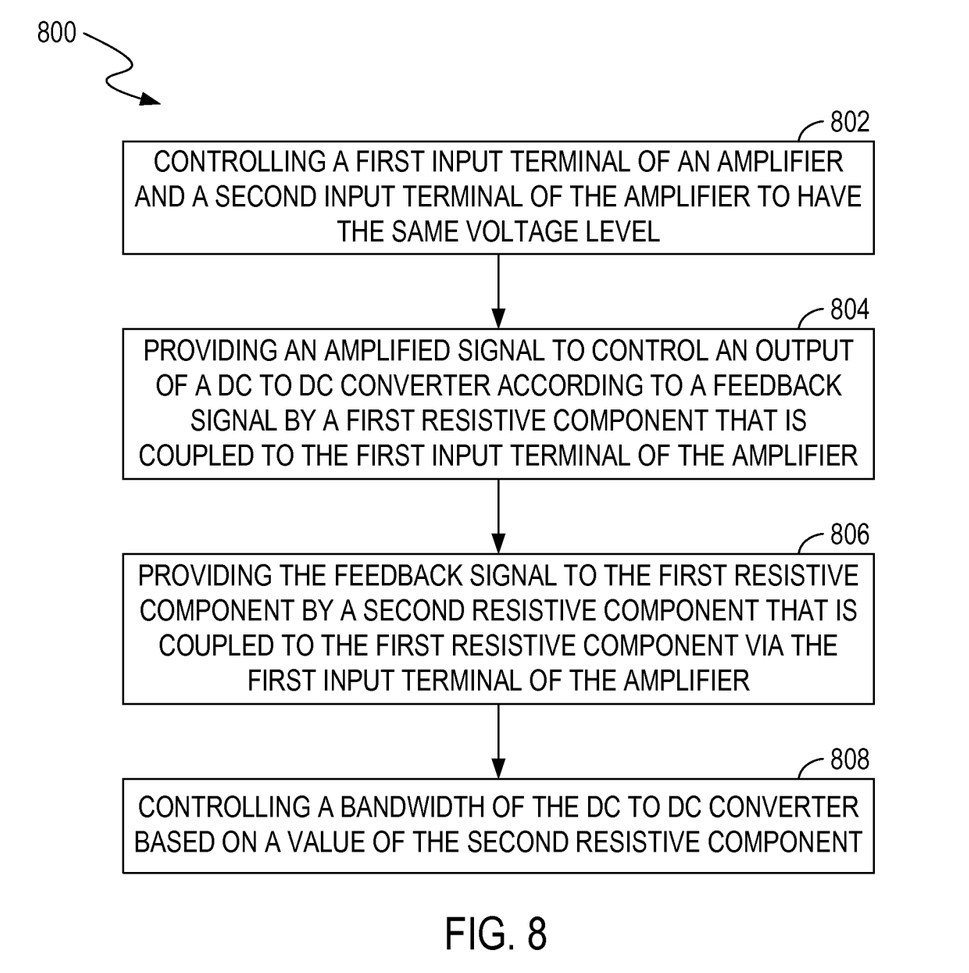
FIG. 8 illustrates a flowchart of examples of operations performed by a DC to DC converter, in accordance with one embodiment of the present invention.

FIG. 8 illustrates a flowchart 800 of examples of operations performed by a DC to DC converter, in accordance with one embodiment of the present invention. FIG. 8 is described in combination FIG. 2, FIG. 3, FIG. 5 and FIG. 6.

In block 802, the EA1 342 controls the inverting input terminal of the EA1 342 and the non-inverting input terminal of the EA1 342 to have the same voltage level. In block 804, the resistor 301 coupled to the inverting input terminal of the EA1 342 provides an amplified signal $V_{EA1}$ to control an output voltage $V_{OUT}$ of the DC to DC converter 200, 300, or 500 according to a feedback current $I_{FB}$. In block 806, the resistor 302 coupled to the resistor 301 via the inverting input terminal of the EA1 342 provides the feedback current $I_{FB}$ to the resistor 301. In block 808, the resistor 302 controls a bandwidth of the DC to DC converter 200, 300, or 500 based on the resistance $R_{302}$ of the resistor 302.

Embodiments according to the present invention provide controllers for DC to DC converters. The controller includes amplification circuitry to generate an amplified signal to control an output voltage of the DC to DC converter. The amplification circuitry includes a first amplification stage, e.g., a resistor-based amplification circuit, that has a relatively wide bandwidth and a relatively fast response speed, and includes a second amplification stage, e.g., a capacitor-based amplification circuit, that has a relatively high gain.

Thus, the controller responds to the output voltage relatively fast and controls the output voltage more accurately and more stably. In addition, the gain and the bandwidth of the controller can be controlled by controlling a resistance parameter in a feedback circuit coupled to the controller. The DC to DC converter can be used in various applications such as power supply systems.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for a power converter, said controller comprising:
  a first amplification stage operable for generating a first amplified signal at a first terminal of an energy storage element according to an output signal of said power converter; and
  a second amplification stage coupled to said first amplification stage and operable for generating a second amplified signal at a second terminal of said energy storage element, varying said second amplified signal in response to a change in said output signal, and decreasing the variation of said second amplified signal based on said first amplified signal,
  wherein said second amplification stage comprises an amplifier operable for comparing said first amplified signal with a reference signal to control charging and discharging of said energy storage element, and operable for decreasing said variation of said second amplified signal if a difference between said first amplified signal and said reference signal is greater than a specified level.

2. The controller as claimed in claim 1, wherein said controller controls a plurality of switches to control said output signal according to said second amplified signal.

3. The controller as claimed in claim 1, wherein said first amplification stage comprises:
  a resistive element having a first end and a second end and operable for providing said first amplified signal at said second end; and an amplifier coupled to said resistive element and operable for maintaining said first end at a reference level.

4. The controller as claimed in claim 3, wherein a current indicative of said output signal flows through said resistive element to generate said first amplified signal.

5. The controller as claimed in claim 3, wherein said controller adjusts said output signal toward a preset level that is determined by said reference level.

6. The controller as claimed in claim 1, wherein said amplifier adjusts said first amplified signal toward said reference signal based on said second amplified signal.

7. The controller as claimed in claim 1, wherein said energy storage element comprises a capacitor.

8. A method for controlling an output signal, said method comprising:
    generating a first amplified signal at a first terminal of an energy storage element according to said output signal;
    comparing said first amplified signal with a reference signal to control charging and discharging of said energy storage element;
    generating a second amplified signal at a second terminal of said energy storage element according to said comparing;
    varying said second amplified signal in response to a change in said output signal; and
    decreasing the variation of said second amplified signal if a difference between said first amplified signal and said reference signal is greater than a specified level.

9. The method as claimed in claim 8, further comprising:
    adjusting said first amplified signal toward said reference signal based on said second amplified signal.

10. The method as claimed in claim 8, wherein said energy storage element comprises a capacitor.

11. The method as claimed in claim 8, wherein said generating said first amplified signal comprises:
    maintaining a first end of a resistive element at a reference level to generate a current indicative of said output signal; and
    generating said first amplified signal at a second end of said resistive element by transferring said current through said resistive element.

12. The method as claimed in claim 11, further comprising:
    adjusting said output signal toward a preset level that is determined by said reference level.

13. The method as claimed in claim 8, further comprising:
    controlling a plurality of switches to control said output signal according to said second amplified signal.

14. A controller for a power converter, said controller comprising:
    control circuitry operable for generating a control signal to control an output signal of said power converter; and
    amplification circuitry coupled to said control circuitry and operable for generating a first amplified signal at a first terminal of an energy storage element according to said output signal, generating a second amplified signal at a second terminal of said energy storage element to control a duty cycle of said control signal, varying said duty cycle in response to a change in said output signal based on said second amplified signal, and decreasing the variation of said duty cycle based on said first amplified signal,
    wherein said amplification circuitry comprises an amplifier operable for comparing said first amplified signal with a reference signal to control charging and discharging of said energy storage element, and operable for decreasing said variation of said second amplified signal if a difference between said first amplified signal and said reference signal is greater than a specified level.

15. The controller as claimed in claim 14, wherein said control signal comprises a pulse signal to control said output signal by controlling a plurality of switches.

16. The controller as claimed in claim 14, wherein said amplification circuitry comprises:
    a resistive element having a first end and a second end and operable for providing said first amplified signal at said second end; and
    an amplifier coupled to said resistive element and operable for maintaining said first end at a reference level.

17. The controller as claimed in claim 16, wherein a current indicative of said output signal flows through said resistive element to generate said first amplified signal.

18. The controller as claimed in claim 16, wherein said controller adjusts said output signal toward a preset level that is determined by said reference level.

19. The controller as claimed in claim 14, wherein said amplifier adjusts said first amplified signal toward said reference signal based on said second amplified signal.

20. The controller as claimed in claim 14, wherein said energy storage element comprises a capacitor.

* * * * *